United States Patent [19]

Akagi et al.

[11] Patent Number: 5,568,331
[45] Date of Patent: Oct. 22, 1996

[54] METHOD OF HEAD POSITIONING AND MAGNETIC RECORDING DISK DRIVE USING THE SAME

[75] Inventors: Kyo Akagi, Fuchu; Masaaki Futamoto, Kanagawa-ken; Fumio Kugiya, Hachioji; Yoshinori Miyamura, Tokyo; Hisashi Takano; Yoshibumi Matsuda, both of Hachioji; Mikio Suzuki, Kokubunji; Takeshi Nakao, Sagamihara; Takayuki Munemoto, Ibaraki-ken; Hirotsugu Fukuoka, Hitachiota; Makoto Aihara, Katsuta; Tokuho Takagaki, Yokohama; Hajime Aoi, Tachikawa; Yosuke Seo, Sagamihara, all of Japan

[73] Assignee: Hitachi, Ltd., Tokyo, Japan

[21] Appl. No.: 603,320

[22] Filed: Oct. 25, 1990

[30] Foreign Application Priority Data

Oct. 27, 1989 [JP] Japan ................... 1-278595
Jan. 24, 1990 [JP] Japan ................... 2-012536

[51] Int. Cl.$^6$ .................................... G11B 5/596
[52] U.S. Cl. ............................ 360/77.07; 360/77.11; 360/135
[58] Field of Search ......................... 360/77.07, 77.05, 360/77.02, 77.11, 135, 48; 427/127, 131

[56] References Cited

U.S. PATENT DOCUMENTS

| | | | |
|---|---|---|---|
| 3,404,392 | 10/1968 | Sordello | 360/77.07 X |
| 3,614,756 | 10/1971 | McIntosh et al. | 360/77.07 X |
| 3,691,543 | 9/1972 | Mueller | 360/77.02 |
| 4,286,296 | 8/1981 | Cunningham | 360/77.07 X |
| 4,287,540 | 9/1981 | Cheatham et al. | 360/77.07 X |
| 4,313,140 | 1/1982 | Keidl | 360/77.07 X |
| 4,551,777 | 11/1985 | Saito et al. | 360/77.11 |
| 4,581,663 | 4/1986 | Tonaka | 360/77.11 X |
| 5,073,836 | 12/1991 | Gill et al. | 360/113 |
| 5,083,226 | 1/1992 | Shiiki et al. | 360/77.05 |
| 5,296,995 | 3/1994 | Yonezawa et al. | 360/77.03 X |

FOREIGN PATENT DOCUMENTS

| | | | |
|---|---|---|---|
| 0094314 | 11/1983 | European Pat. Off. | 360/77.05 |
| 53-138314 | 12/1978 | Japan | 360/77.05 |
| 61-24021 | 2/1986 | Japan. | |

OTHER PUBLICATIONS

Hoagland, "Recording Medium With Discrete Alternate Track of Differing Coercive Force" IBM Tech Dis vol. 20, No. 7 Dec. 1977.

"IEEE Transactions on Magnetics", vol. MAG-17, No. 6, Nov. 1981, A Head Positioning System Using Buried Servos, N. H. Hansen, pp. 2735-2738.

*Primary Examiner*—Aristotelis Psitos
*Assistant Examiner*—James T. Wilson
*Attorney, Agent, or Firm*—Fay, Sharpe, Beall, Fagan, Minnich & McKee

[57] ABSTRACT

A method and device of head positioning in an information recording/reading device in which a magnetic recording medium with data tracks for recording information thereon is provided and a magnetic head is positioned on the data track to record/read out the information, wherein a data signal is recorded in the data recording layer of said recording medium, a servo signal is recorded in the servo signal recording layer located below said data signal recording layer, said data signal is read out using a data magnetic head whereas said servo signal is read out using a servo magnetic head, and the frequency of said servo signal is within the range of the gap-null frequency of said data magnetic head whereas the frequency of said data signal is within the range of the gap-null frequency of said servo magnetic head, and said magnetic head is positioned on the data track on the basis of said servo signal. A method and device of head positioning in an information recording/reading device in which a magnetic recording medium with data tracks for recording information thereon is provided and a magnetic head is positioned on the data track to record/read out the information, wherein the data tracks are discrete tracks in which adjacent data tracks are separated by a groove located therebetween, a data signal is recorded on the data track of said recording medium, a servo signal is recorded on the servo tracks of grooves between said adjacent data tracks, and said magnetic head is positioned on the data track on the basis of said servo signal.

22 Claims, 12 Drawing Sheets

LIGHT EXPOSURE ETCHING

LIGHT EXPOSURE ETCHING

METHOD OF HEAD POSITIONING AND MAGNETIC RECORDING DISK DRIVE USING THE SAME

BACKGROUND OF THE INVENTION

The present invention relates to a method of head positioning in an information recording device such as a magnetic disk device, a floppy disk device, a magnetic tape device, an opto-magnetic disk device and a magnetic card device, and a magnetic recording disk drive using this method. More particularly, the present invention relates for technology suitable to a large capacity disk drive with high track density, and for positioning a head on a target data track with high accuracy.

In order to read information recorded on a magnetic medium with high accuracy, a signal conversion device, for example, a magnetic head must be positioned with high accuracy on the target of the recording position of a recording medium. However, the positioning becomes very difficult with increase of the track density. So, it is preferable that a servo signal is located in the extreme neighborhood of the target data track. Such an idea of a data embedded servo for locating a servo signal on the data surface is included in a system of sector servo or buried servo in a magnetic disk device, a floppy disk device, etc. having a rotary recording medium. In the sector servo system, the positioning accuracy is greatly influenced by the number of sectors, and the frequency bands of the servo system is also limited. The buried servo system is more favorable to improve the positioning accuracy than the sector servo system in terms of that the former is not a serial servo system. In the buried servo system, as disclosed in IEEE Transaction on Magnetics Mag.-176, the frequency bands for a data signal and a servo signal are discriminated so that both signals can be accurately separated in such a manner that the recording frequency of the data signal to be recorded on the upper layer of a recording medium is several MHz and that of the servo signal to be recorded on the lower layer is several hundred KHz.

SUMMARY OF THE INVENTION

In the technique disclosed in the above reference IEEE, in order to discriminate between the servo signal and the data signal, different frequencies are allotted to both signals which are separated by only descriminating the corresponding read out signals through a filter. Thus, frequency band widths of the servo signal and the data signal will be limited. Lowering the frequency of the data signal deteriorates the recording density and lowering that of the servo signal attenuates the resolution of positioning. Further, the bandwidth of the servo signal is limited so that the resolution of positioning is restricted by that bandwidth, thus deteriorating the positioning accuracy. This is very problematic particularly when the track width is narrow. Further, the prior art technique does not take into consideration the deterioration of the servo signal due to rewrite of the data signal.

A first object of the present invention is to provide a method of head positioning with high accuracy in a high density magnetic recording disk drive with a narrow track width, and a magnetic recording disk drive using this method. More concretely, the first object of the present invention is to provide a method of head positioning which can freely set the frequency bands for a data signal and a servo signal with interference therebetween excluded in the magnetic recording disk drive in a serial servo system, and a magnetic recording disk drive using this method.

A second object of the present invention is to provide a method of head positioning which can write a data signal and a servo signal at a high frequency in a buried servo system which is a serial servo system, and a magnetic recording disk drive.

A third object of the present invention is to provide a method of head positioning in which a servo signal is not influenced by rewrite of a data signal in a buried servo system which is a serial servo system.

The first object of the present invention can be achieved by setting the head gap length of the magnetic head in the magnetic recording disk drive so that it is different between the portions of detecting the data signal and servo signal, or setting the spacing between the track on which the signals are recorded and the head so that it is different between the portions of detecting the data signal and the servo signal.

The second object of the present invention can be achieved by using a data magnetic head dedicated to reproduction of the data signal and a servo magnetic head dedicated to reproduction of the servo signal and setting the servo signal and data signal at the frequency within the dead band zone (gap-null frequency) for the data magnetic head and that within the dead band for the servo magnetic head.

In the first and second objects of the present invention, there is provided a magnetic recording disk drive comprising: a magnetic disk having data tracks on which data are recorded; a spindle for rotating the magnetic disk; a data magnetic head for recording and reading out a data signal on and from the data tracks; servo tracks on which a servo signal is recorded between the data tracks; a servo magnetic head for reading out the servo signal; and a servo circuit and an actuator for positioning the data magnetic head on a data track on the basis of the servo signal, wherein the gap length of the data magnetic head is different from that of the servo magnetic head. In this case, it should be noted that the frequency of the servo signal is within the range of the gap-null frequency for the data magnetic head while that of the data signal is within the range of the gap-null frequency for the servo magnetic head.

It is known as the reproduction characteristic of the inductive magnetic head having a certain gap length that it provides a dead band zone when the wavelength of a write signal on a recording medium is an integer times as large as the gap length. Different gap lengths provide the corresponding different dead band zones. Therefore, if the dead band zones for the data head and the servo head are separated from each other, one head can read out the corresponding signal at the dead band zone, i.e. gap-null frequency therefor without interfering with the signal read out from the other head.

It is preferable that two heads for reproduction of a data signal and for a servo signal are mounted on the same actuator. The servo signal and the data signal are recorded on a recording medium with the wavelength relative to the gap length of the corresponding head, respectively. When the servo head reads out the servo signal, it does not detect the data signal since the wavelength of the data signal corresponds to the gap-null frequency of the servo head, i.e. an integer times as large as the gap length of the servo head. The actuator can position the data head with high accuracy on the basis of the servo signal read out. Further, when the data head reads out the data signal, it does not detect the servo signal since the wavelength of the servo signal is that in the neighborhood of the gap-null frequency of the data head. Thus, the data head can read out the data signal with high quality.

The third object of the present invention can be achieved by using a discrete magnetic track medium in which a data signal is recorded at its land portion whereas a servo signal is recorded at its groove portion.

In the third object of the present invention, there is provided a magnetic recording disk drive comprising: a magnetic disk having data tracks on which data are recorded; a spindle for rotating the magnetic disk; a data magnetic head for recording and reading out a data signal on and from the data tracks; servo tracks on which a servo signal is recorded between the data tracks; a servo magnetic head for reading out the servo signal; and a servo circuit and an actuator for positioning the data magnetic head on a data track on the basis of the servo signal; wherein the spacing between data head and data track surface is different from that between the servo head and servo track surface.

In this case, a recording film on which ordinary data can be recorded is formed at the land portion of the discrete medium, and it is used as a data signal region. Another recording film on which servo information can be recorded is also formed at the groove portion of the discrete film, and it is used as a servo signal region. In one aspect, read of the servo information and read and write of the data are carried out using one head. The write current for the servo information and that for the data may be different. The magnetic characteristics of the magnetic films at the land and groove portions may be different. In another aspect, the servo head and data head may be two heads having different characteristics. The servo information may be previously recorded in fabricating the recording medium. The write frequency for the data signal region is set to be different from that for the servo region. For example, the former is set to be three times, or more higher or lower than the latter, thus easily making frequency separation. If the dead band zones for the data head and the servo head are separated from each other, and the servo signal and the data signal are each recorded at the gap-null frequency for the other head, interference therebetween can be decreased. The magnetic recording disk drive according to the present invention incorporates a plurality of recording media each having on at least its one side magnetic layers for recording data and positioning servo information, and comprises a plurality of magnetic heads corresponding to the respective sides which are individually driven. The data tracks, the servo tracks, and the data signal and servo signal recorded on these tracks can be constituted as described above.

In operation, if information is to be read from a predetermined track, at a first time, a head is positioned and trimmed. The data signal and the servo signal are subjected to frequency separation; they are simultaneously extracted and separated from each other, to thereby simultaneously execute head positioning during track following and data read.

When the recording media are built in a disk drive, the center of the track circles on the recording media do not necessarily coincide with the rotating center of a spindle attached to the media. On the other hand, all the magnetic heads are in a predetermined position relationship so that it is impossible to always locate the respective heads on the tracks of all the recording media. Then, a discrete actuator is added to a head attaching arm to individually drive the magnetic heads. The related art relative to the discrete medium is disclosed in JP-A-61-24021.

Further, if the data tracks and the servo tracks are mixed, interference of the data signal and the servo signal with each other must be avoided. Particularly, in rewriting data, the servo signal must not be influenced by the data signal. To this end, it is preferable to set the medium-head spacing, the magnetic characteristic of a recording layer, the thickness of the recording layer, a recording current, etc, so that they are different from the data tracks and the servo tracks. For example, assuming that HC1 is the coercive force of the magnetic film of the data track, t11 is the film thickness thereof, HC2 is the coercive force of the magnetic layer of the servo track, t12 is the film thickness thereof, E1(D) is an output of the signal with a bit density D from the data track when the distance between the data recording head and the data track surface is DD, E2(D) is an output of the signal with a bit density D from the servo track when the distance between the servo recording head and the servo track surface is DD+h, h is the depth of a groove in the magnetic medium, D1 is the bit density of the data signal, and D2 is the bit density of the servo signal. Hc1, t11, Hc2, t12, D1, D2, DD and h are set to satisfy the following relationship:

$$E2(D2) > E1(D1), E2(D1) \approx 0$$

Further, assuming that P1 is an overwrite amount when recorded with the distance DD between the data head and the data track surface, P2 is an overwrite amount when recorded with the distance between the servo head and the servo track surface, P is an overwrite amount permitting data to be rewritten, h is the depth of a groove in the magnetic medium, P3 is an overwrite amount when recorded with the distance DD - h between the data head and the data track surface, I1, I2, DD and h are set to satisfy the following relationship:

$$P1 < P < P3, P < P2$$

In order to easily separate the data signal and the servo signal from each other, I1, I2, DD, and h are preferably set so that the reproduction outputs of the data signal and the servo signal are substantially equal.

DESCRIPTION OF THE PREFERRED EMBODIMENTS

Now referring to the the drawings, explanation will be given for several embodiments of the present invention.

Figure 1:
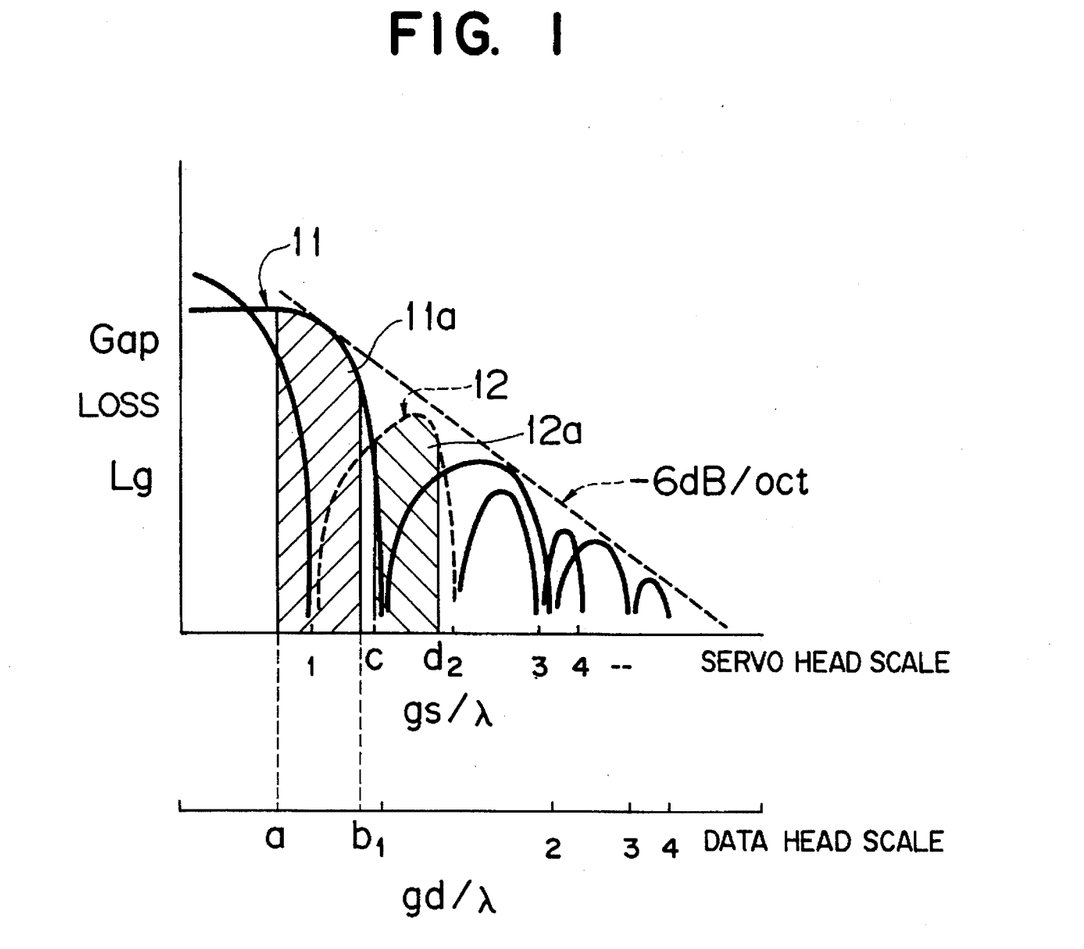
FIG. 1 is a graph showing the basic idea of the present invention.

FIG. 1 shows the basic idea of one embodiment of the present invention. Generally, the gap loss of a magnetic head is represented as a function of a gap length g and a recording signal wavelength $\lambda$ as follows:

$$Lg=-20 \log_{10}\{\sin(\pi g/\lambda)/\pi g/\lambda)\} \text{ [dB]}$$

Figure 2:
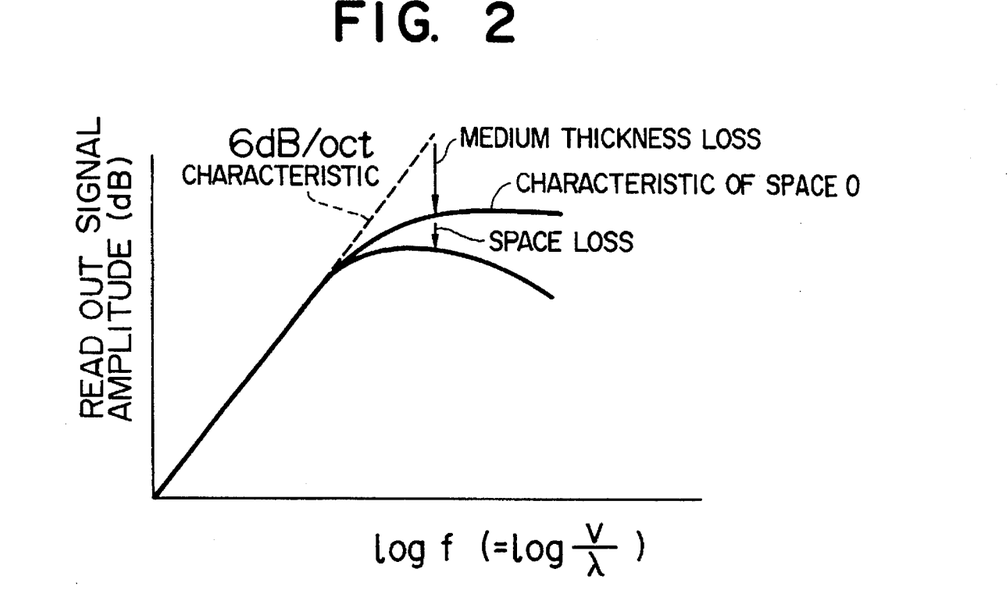
FIG. 2 is a graph showing the frequency characteristic of an output read out by a magnetic head.
Figure 3:
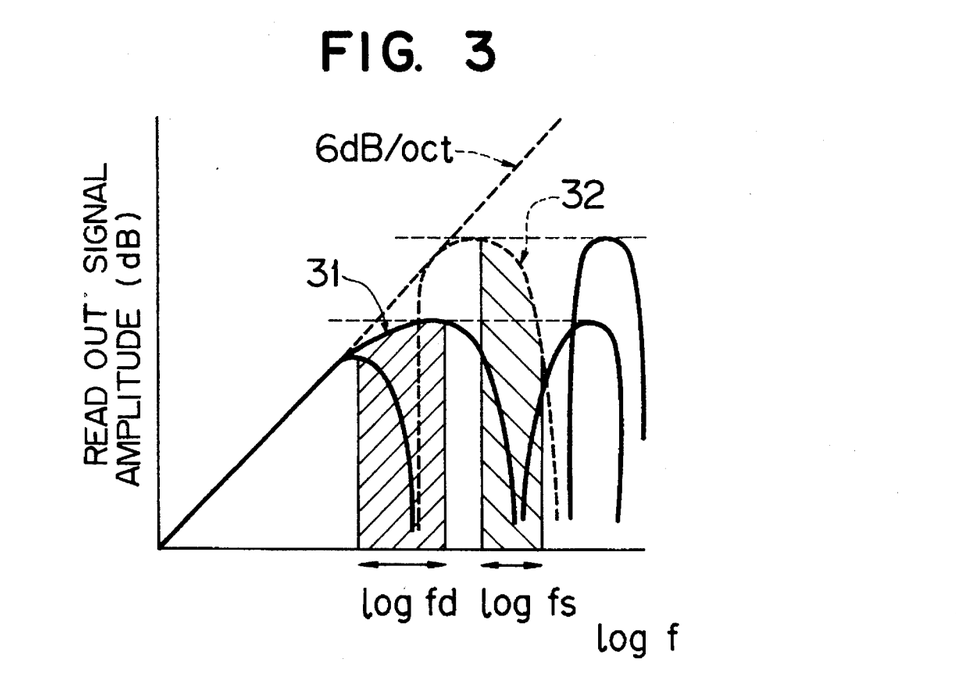
FIG. 3 is a graph showing the frequency characteristic of an output read out by a magnetic head in accordance with the present invention.

With the ratio of the gap length g to the recording signal wavelength Lg taken in an abscissa and the gap loss Lg taken in an ordinate, the gap loss characteristic of a head for reading out a data signal (referred to as data head) can be illustrated as curve 11 in FIG. 1. Now it is assumed that the gap length gs of a head for reading out a servo signal (referred to as servo head) is shorter than the gap length gd of the data head. This intends to set a data signal at a higher frequency than that of a servo signal as described later. Therefore, in the abscissa of FIG. 1, the scale of the data head is magnified as compared with that of the servo head. When illustrated on the graph on which the curve 11 is shown, the gap loss characteristic of the servo head can be shown as curve 12. With the gap length fixed, the abscissa is in inverse proportion to the recording signal wavelength $\lambda$ and so is in direct proportion to the reproduction frequency. Thus, as shown in FIG. 2, with the gap loss disregarded, the amplitude of a reading out signal has the frequency characteristic of 6 dB/oct including, in its high frequency region, reduction of the signal amplitude due to the thickness of a recording medium and the spacing between the medium and the head gap. Therefore, the frequency characteristic of the read out signal amplitude under consideration of the gap loss is a composition of the characteristics of FIGS. 1 and 2; as seen from FIG. 3, the envelopes of the curves are substantially horizontal at frequencies higher than a certain frequency.

Meanwhile, if the device is set so that the read out signal having an output smaller than a predetermined threshold value is not read, the signal cannot be reproduced at the frequencies in the neighborhood of the gap-null frequency. Specifically, in FIG. 1, the servo head cannot read out the signal in a region 12a, while the data head cannot read out the signal in a region 11a. Further, in FIG. 3 in which the frequency characteristic of the data head is shown as curve 31 and that of the servo head is shown as curve 32, the data signal can be read out at its reproduction frequency fd without interference from the servo signal whereas the servo signal can be read out at its reproduction frequency fs without interference from the data signal.

Figure 4:
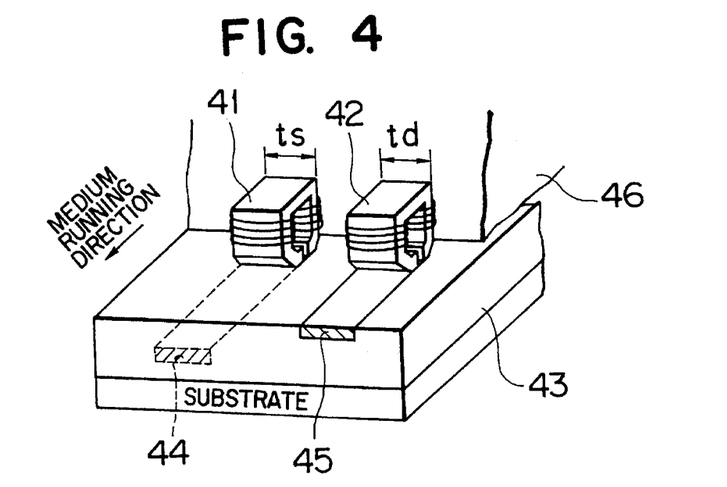
FIG. 4 is a view schematically showing an actual application of the present invention.

FIG. 4 shows an example of heads and tracks to which this embodiment is actually applied. A servo head 41 and a data head 42 both are mounted on the same rigid body, e.g. a slider 46. Both heads may not be necessarily aligned in a track width direction but may be staggered in a medium running direction. With respect to the magnetic layer of a medium 43, its lower layer is allotted for recording the servo signal whereas its upper layer is allotted for recording the data signal. Such an arrangement makes it difficult to deteriorate the servo signal in rewriting the data signal. In operation, when the servo head 41 is just positioned on a servo track 44, the data signal is written on a data track 45. In this case, if the servo head 41 tracks the servo track 44, the data signal can be always correctly read out from the data track 45. The data signal may be written on the upper layer of the servo track 44 whereas the servo signal may be written on the lower layer of the data track 45. This permits the entire surface of the recording medium to be efficiently used.

Figure 5:
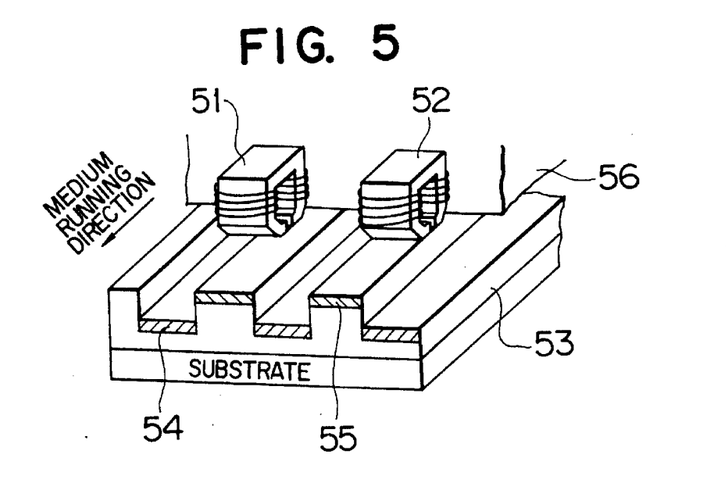
FIG. 5 is a view schematically showing another actual application of the present invention.

FIG. 5 shows another example of heads and tracks to which this embodiment is actually applied. A servo head 51 and a data head 52 are constructed in the same manner as in FIG. 4. A recording medium 53 has discrete tracks whose surface is rugged; its land portions correspond to data tracks and its groove portions correspond to servo tracks. The magnetic layers at the land portions are provided to record a data signal whereas those of the groove portions are provided to record a servo signal. The positioning operation is carried out in the same manner as in the previous example. Since in the medium structure as shown in FIG. 5, the adjacent data tracks are physically discrete from each other, an adjacent signal is difficult to enter the track at issue as a noise component, thus assuring high quality of the data signal. Further, since the data track and the servo track are also discrete from each other, less interference from each other will be given.

Figure 6:
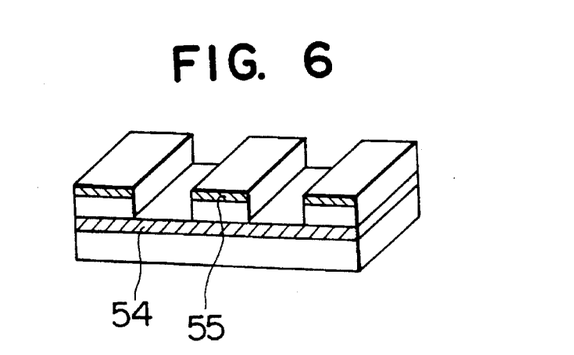
FIG. 6 is a perspective view of a modification of the example of FIG. 5.

A modification of FIG. 5 is shown in FIG. 6. The magnetic lower layer is extended over the entire medium. This is very advantageous to improve the quality of the servo signal since the servo signal is recorded also below the data tracks. In FIG. 6, the other construction of the medium is the same as in FIG. 4. The width ts of the servo track 4 in the track width direction in FIGS. 4 and 5 may not necessarily be equal to that td of the data head. If it is set to be longer than the latter, or the servo signal is written in a multi-phase, the positioning accuracy of the data head can be further improved.

Meanwhile, if the present invention is to be applied to a magnetic recording device having a disk recording medium such as a magnetic disk, particular attention should be paid to the range of a write frequency. Specifically, if the write frequency is fixed, the disk medium has different recording wavelengths in accordance with its radial position. So the value of g/$\lambda$ varies in the graph of FIG. 1. For example, in the device having a usable medium region in which the ratio of the radius at its innermost track to that at its outermost track is 1.5, with the write frequency fixed, the recording wavelength λ varies 1.5 times from the innermost track to the outermost track. Therefore, it may be assumed that gd/λ of the data signal varies in the range of e.g. $0.5<(gd/\lambda)<0.75$, and gs/λ of the servo signal varies in the range of $1.2<(gs/\lambda)<1.8$.

Namely, it is assumed in FIG. 1 that the values of a and b with respect to the data head are 0.5 and 0.75, respectively, and those of c and d are 1.2 and 1.8, respectively. At a certain radial position, the servo signal is read out using the servo head having a gap length approximately equal to the write signal frequency at the first gap-null range of the data head so that gs÷λd. Likewise, at a certain radial position, the data signal is read out using the data head having a gap length approximately equal to the first gap-null range of the servo head so that gd÷λs. If fs>fd, λs<λd so that gs>gd.

Although the technique described above can be applied to both logitudinal recording and perpendicular recording, it is particularly suitable to the perpendicular recording in which the gap-null ranges as shown in FIG. 1 appear remarkably.

Figure 7:
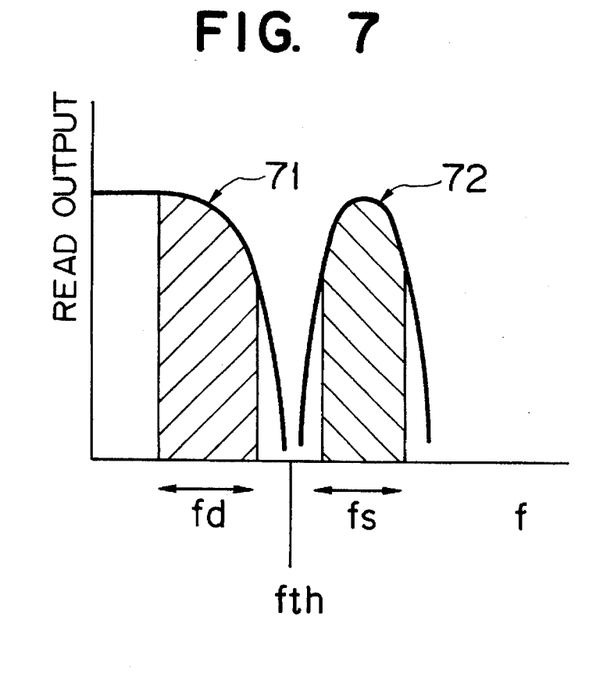
FIG. 7 is a graph showing the principle of another embodiment of the present invention.

FIG. 7 is a graph for explaining another embodiment of the present invention. As shown FIG. 3, and FIG. 7, the abscissa represents a frequency and the ordinate represents a read output. In this embodiment, it is noted that the reproduction frequencies for the servo head and data head having the same gap lengths as those described above are different; the data signal (curve 71) read out by the data head is passed through a low-pass filter whereas the servo signal (curve 72) read out by the servo head is passed through a high-pass filter. Thus, the curves 71 and 72 can be clearly separated as having a data signal characteristic and a servo signal characteristic, respectively, with the threshold frequency fth. Therefore, by using the data signal and the servo signal within the shaded ranges, they will not interfere with each other.

Figure 8:
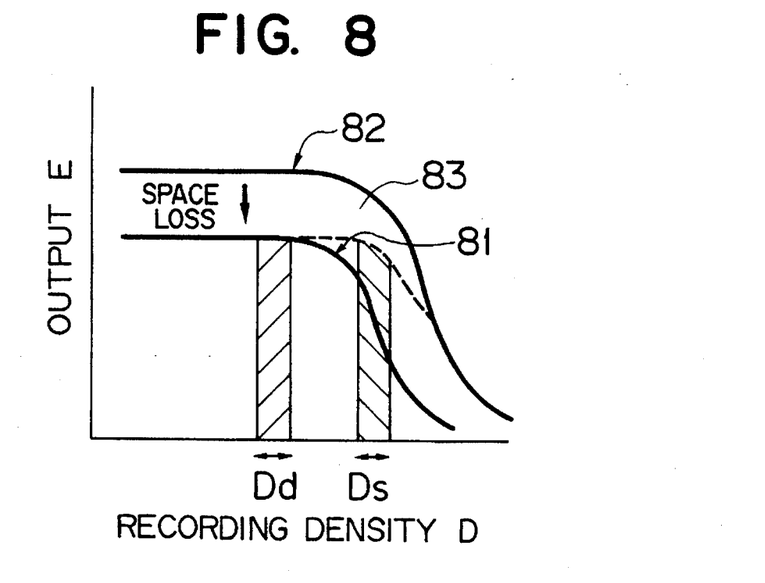
FIG. 8 is a graph showing the characteristics of the magnetic layers of the data signal recording layer and servo signal recording layer of a recording medium which can be applied to the present invention.

FIG. 8 is a graph showing the characteristics of the magnetic films of the data signal recording layer and the servo signal recording layer in the recording medium used in the present invention. In FIG. 8, the abscissa represents the bit density of data whereas the ordinate represents a read output. The magnetic characteristic of the data signal recording layer is shown as curve 81, and the bit density within a range Dd is used for the data signal. On the other hand, the magnetic characteristic of the servo signal recording layer can be shown as curve 82. However, its actual characteristic is shown as curve 83 because of the spacing loss due to that the servo signal recording layer is located below the data signal recording layer. In this case, the recording density within a range Ds is used for the servo signal. In order to obtain such a characteristic, the recording medium is desired to have a coercive force which is larger in the servo layer than in the data layer and a saturation magnetization which to approximately equal in both layers or slightly larger in the servo layer than in the data layer. In this way, outputs of the data signal is approximately equal to the servo signal so that both signals can be separated easily and with high accuracy.

Now explanation will be given for another embodiment of the present invention. In accordance with this embodiment, head positioning of the device having a discrete recording medium can be made with high accuracy by a simple head structure on the basis of substantially the same idea as the conventional positioning using a servo disk and servo head.

Figure 9:
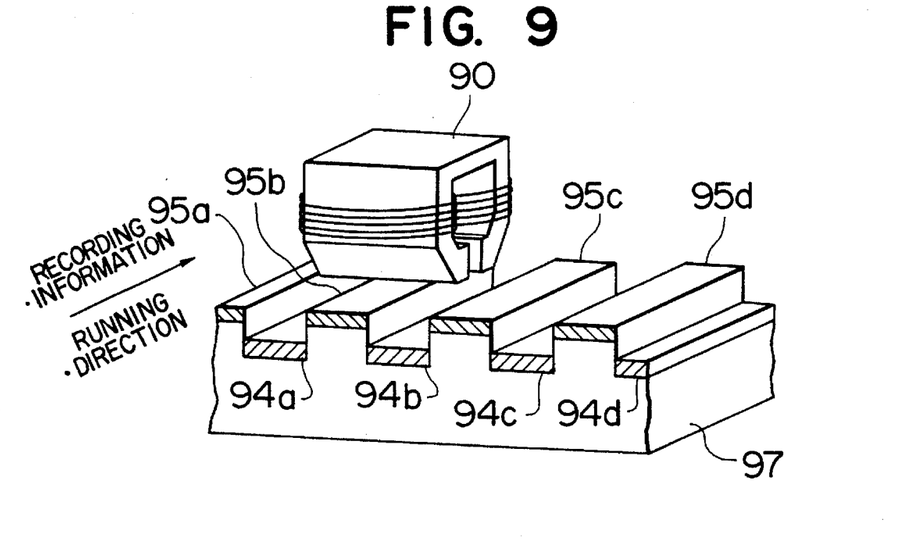
FIG. 9 is a perspective view of a disk drive to which still another embodiment is applied.

FIG. 9 is a sectional perspective view of the basic structure of a discrete recording medium. Magnetic layers are laminated on the land portions formed on the surface of the medium in the traveling direction of recorded information; they are used as data tracks 95a, 95b, 95c, 95d, . . . Further, other magnetic layers are laminated on the groove portions formed on the bottom surfaces of the groove portions between the adjacent data tracks; they are used as servo tracks 94a, 94b, 94c, 94d, . . . . A magnetic head 90 has a gap length partially extending over at least the servo tracks 94a and 94b in accessing data signal recorded on the data track 95b. It is noted that the magnetic layers are formed on a medium substrate with grooves previously made.

Additionally, in FIG. 9, the data track width is set, for example, in 1 to 3 μm, and the pitch between them is set, for example, in 2.5 to 5 μm. Further, A ratio of the track/inch (TPI) is set, for example, in 5000 TPI or more (conventionally 2000 TPI) and a ratio of the bit/inch(BPI) is set, for example, in 60 to 100 kBPI (conventionally 30 to 40 kBPI).

Figure 10:
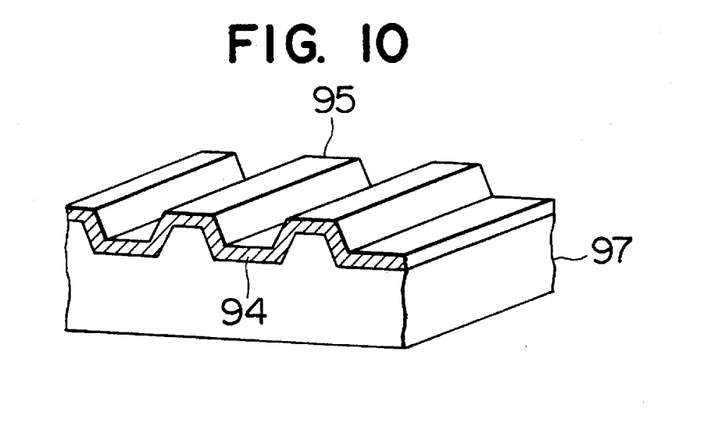
FIGS. 10 and 11 are perspective views of modifications of the embodiment of FIG. 9.
Figure 11:
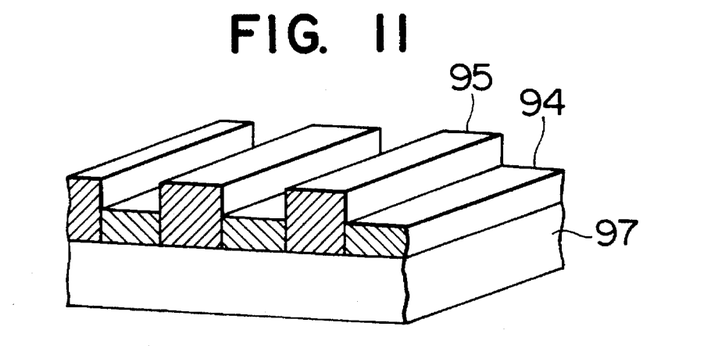

FIGS. 10 and 11 show modifications of the recording medium shown in FIG. 9.

In FIG. 10, a magnetic layer is uniformly laminated on the grooves previously formed on the substrate 97 to have the data tracks 95 and servo tracks 94.

In FIG. 11, magnetic layers for recording a data signal and those for recording a servo signal which have different heights are laminated on the flat substrate 97.

In those modifications, the data signal and the servo signal are recorded in the same manner as in the embodiment of FIG. 9. Additionally, the process for fabricating the magnetic layers will be described later.

Figure 12:
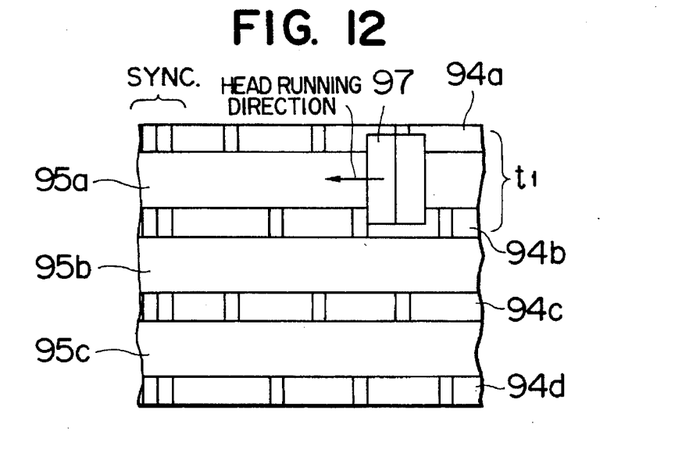
FIGS. 12 to 14 are views schematically showing the relationship between a track pitch and head width.
Figure 13:
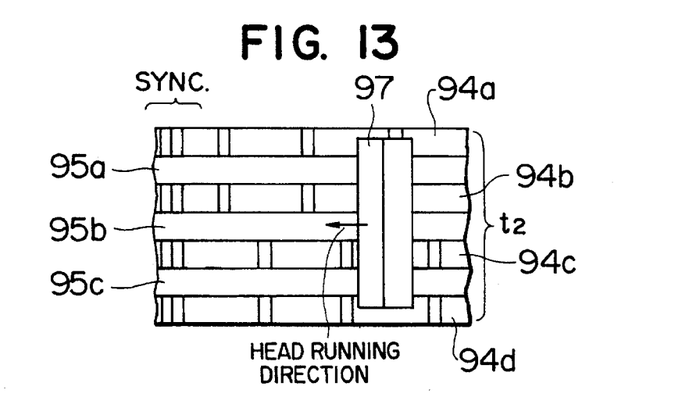
Figure 14:
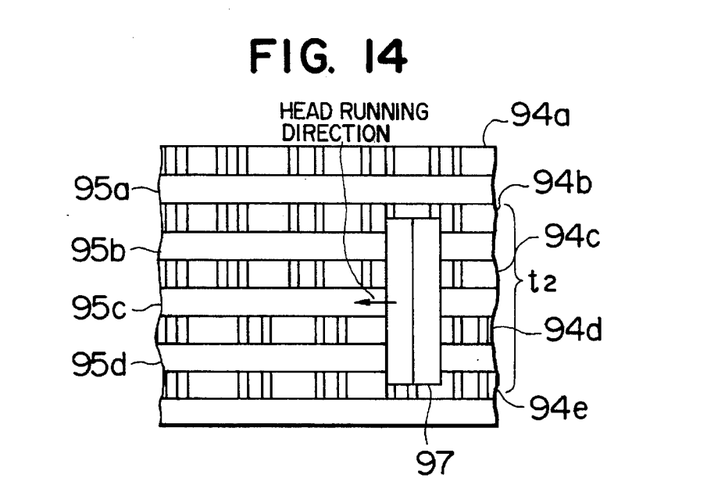

FIGS. 12 to 14 are plan views each showing the relationship between the track width and the track pitch of a recording medium.

In FIG. 12, the head 97 travels to cover one data track on one land portion, e.g. the data track 95a and the servo tracks on the groove portions on both sides thereof, e.g. the servo tracks 94a and 94b. Thus, the width t1 of the head 97 in the track direction is equal to a width including one land portion and parts of the groove portions on both sides thereof. The servo signal can be recorded as one phase dibit signal or a magnetic servo signal similar to it. Specifically, the head 97 has only to be positioned so that the servo signals recorded on both surfaces of the data track 95a have the same amplitude. Unlike positioning in the ordinary magnetic recording, the head 97 is not required to be precisely located on the data track 95a, but can be positioned with clearance of the width of the grooves 94a and 94b on both surfaces of the data track 95a.

In FIG. 13, the head 97 travels so as to cover a plurality of land portions 95a, 95b, 95c, . . . . The width of the head 97 is equal to a width to cover the plurality of land portions and the grooves of both sides thereof. Thus, the substantial width t2 of the data track extends over a plurality of land portions covered by the head 97. The servo signal can be recorded as one phase or multi-phase dibit signal or a magnetic servo signal similar to it.

FIG. 14 shows the manner of recording the multi-phase dibit signal. Unlike positioning in the ordinary magnetic recording, the head 97 is not required to be precisely located on the data track 95a having a width t2 but can be positioned with clearance of the width of the grooves on both sides of the data tracks 95a to 95d.

Explanation will be made on a further embodiment of the present invention with reference to FIGS. 15 and 16 which schematically show the currents in writing a data signal and a servo signal on the data track and the servo track.

Figure 15:
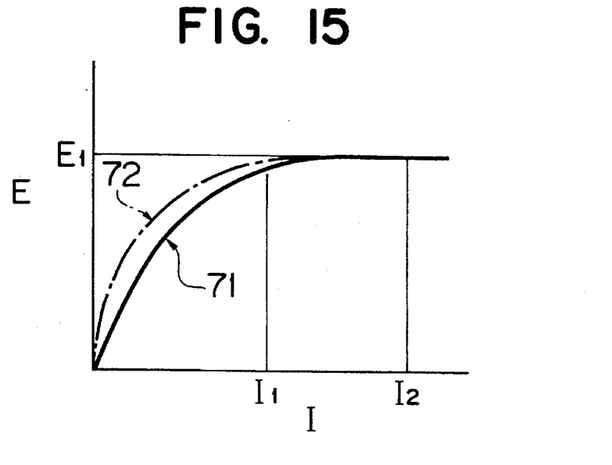
FIG. 15 is a graph showing the relationship between the write current of a magnetic head and an output read out.

In FIG. 15, the abscissa represents a current I to be passed through the head and the ordinate represents a reproduction output E when the information recorded is read out by the head. Then, the relationship between I and E can be generally illustrated as curve 72. As seen from FIG. 15, if the servo signal is written on the servo track by passing the current value I2, for example, 30 to 40 mA$_{o-p}$ in a thin-film type inductive head, and the data signal is written on the data track by passing the current value I1, for example, 10 to 20 mA$_{o-p}$ in the same thin film type inductive head, the head reproduction outputs E1 remain constant.

Figure 16:
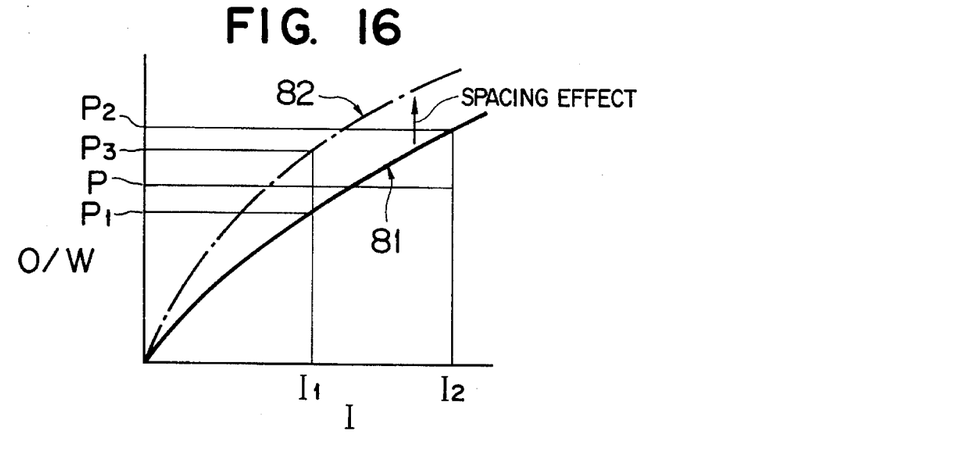
FIG. 16 is a graph showing the relationship between the write current of a magnetic head and an overwrite amount.

Assuming that in FIG. 16, the abscissa represents a write current I and the ordinate represents an overwrite O/W (S/N), the relationship therebetween can be generally illustrated as curve 81. Now, like the above case, it is assumed that the servo signal is written on the servo track with the current of I2 and the data signal is written on the data track with the current of I1. Then, the overwrite amount of the servo track is P2, for example, 40 to 50 dB in the head mentioned above, whereas that of the data track is P1, for example, 10 to 20 dB in the above head. Since the overwrite amount P1 of the data track does not exceed a prescribed overwrite amount p, for example, 30 dB in the above head, the overwrite cannot be performed under this condition. However, if the level difference between the land portion and the groove portion is suitably set since the data track located on the land portion is nearer to the head than the servo track is, the characteristic of the data track is actually illustrated as curve 82 owing to the spacing effect. Thus, P3>P at the current of I1 is enough to perform the overwrite. Then, the reproduction output E1 in FIG. 15 when taking the above level difference into consideration is illustrated as curve 72 so that it still remains constant at both currents of I1 and I2. Therefore, if the level difference between the land portion and the groove portion of the medium, i.e. the depth of a discrete track medium, and the recording current of the head are suitably set, rewriting the data signal will not influence the servo signal.

Figure 17:
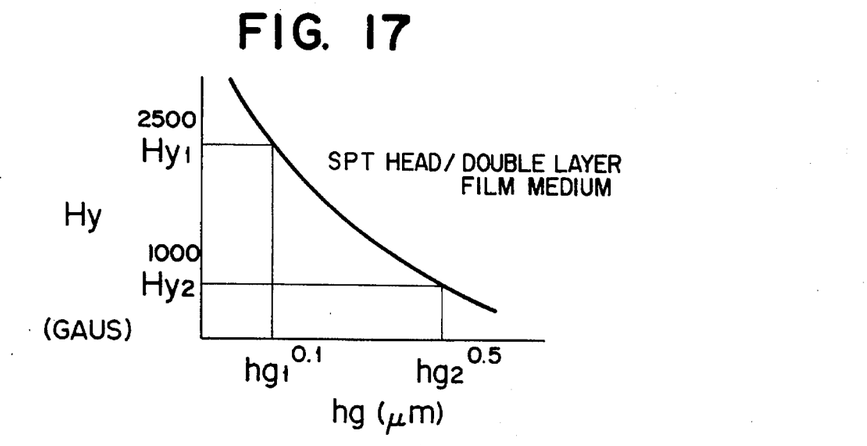
FIG. 17 is a graph showing the relationship between the spacing of a vertical head and the magnetic field intensity thereof.

FIG. 17 is a graph for explaining a further embodiment of the present invention. Generally, the output of the head for perpendicular recording greatly depends on the distance between a recording medium and a magnetic head. For example, the combination of an SPT (single pole type) head and a double film medium has the characteristic as shown in FIG. 17. In FIG. 17, the abscissa represents a spacing and the ordinate represents a generated magnetic field intensity. If signals are recorded using the head having such a characteristic, since the data track is located nearer to the head than the servo track is, the intensity of the magnetic field exerted on the respective tracks is Hy1 at the data track position and Hy2 at the servo track position. Therefore, if Hy1 and Hy2, i.e., spacings hg1 and hg2 are set as shown in FIG. 17, rewriting the data signal will almost not influence the servo signal.

Figure 18:
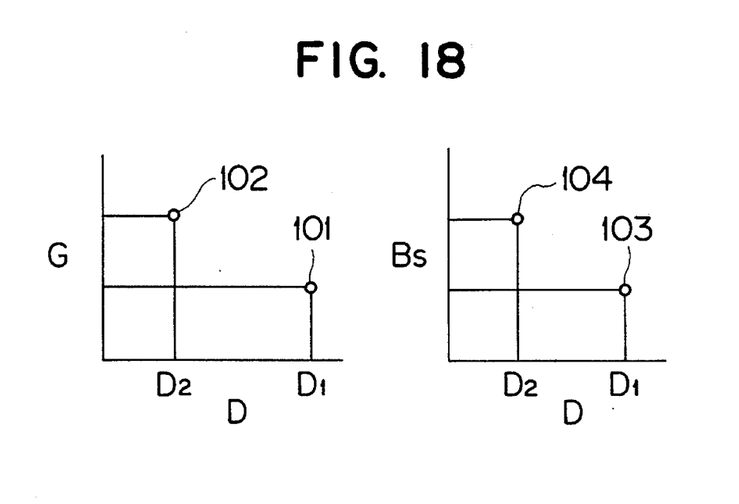
FIG. 18 is a graph showing the relationship among the gap length and the saturation magnetic flux density of a magnetic head and a bit density.

FIG. 18 schematically shows the shape-magnetic characteristic of a servo head and a data head in the case of using two kinds of heads, the servo head and the data head. In FIG. 18, the abscissa represents a bit density D and the ordinate represents the gap length G of the head or saturation magnetic flux density Bs. Now it should be noted that the bit density corresponds to a recording/reproducing frequency. As seen from FIG. 18, the gap length G is larger in the servo head (as shown at point 102) than in the data head (as shown at point 101), and the saturation magnetic flux density Bs is also larger in the servo head (as shown at point 104) than in the data head (as shown at point 103). In this way, particularly, the data signal can be recorded with high density and the servo signal can be surely recorded even with wide head-medium spacing.

Figure 19:
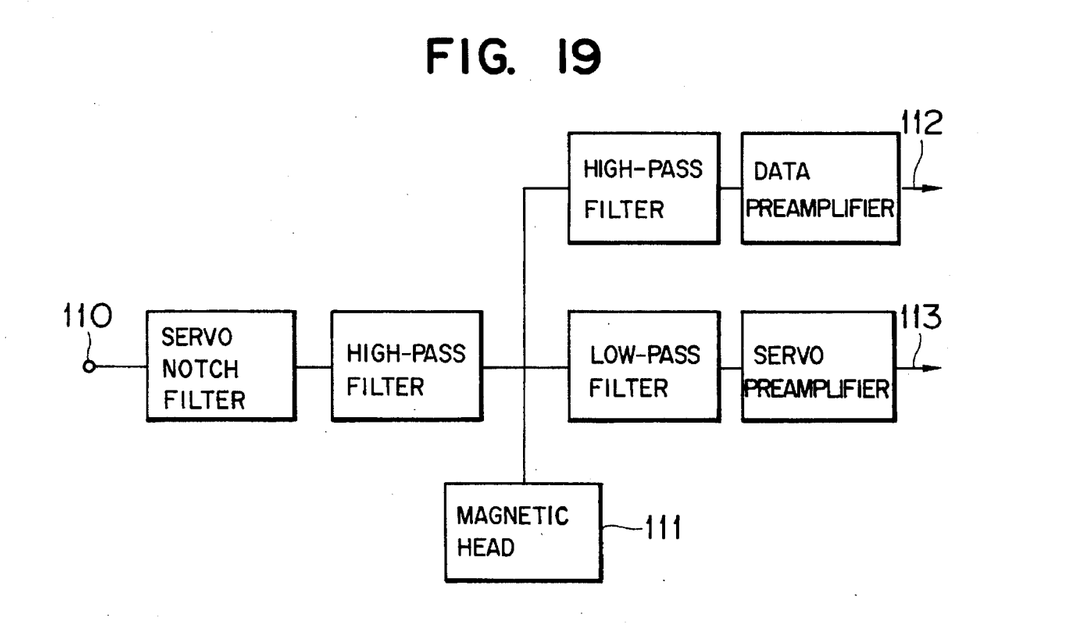
FIG. 19 is a circuit diagram for frequency-separating a servo signal and a data signal.

FIG. 19 is a block diagram showing an example of the circuit for executing the frequency separation between a servo signal and a data signal in the present invention. In writing, a data write signal supplied from a terminal 110 passes through a servo notch filter and high-pass filter and the data signal thus generated is recorded on a recording medium by a magnetic head 111. On the other hand, in reading, the servo signal passing through a low-pass filter and a servo preamplifier is read out as a servo signal 113, and the data signal passing through a low-pass filter and a data preamplifier is read out as a data signal 112.

In the case where two kinds of heads for write and read, the read and write can be separately carried by using the gap length and the saturation magnetic flux density selected as described above. In this case, the head in which the gap length is short and the saturation magnetic flux density is low, is selected as a head for data signal rewrite; this permits the data signal to be recorded with high density. On the other hand, the head in which the gap length is long and the saturation magnetic flux density is large, is selected as a head for reading the data signal and the servo signal. The frequency separation between the data signal and the servo signal can be carried out by the frequency separation circuit described above.

Figure 20A:
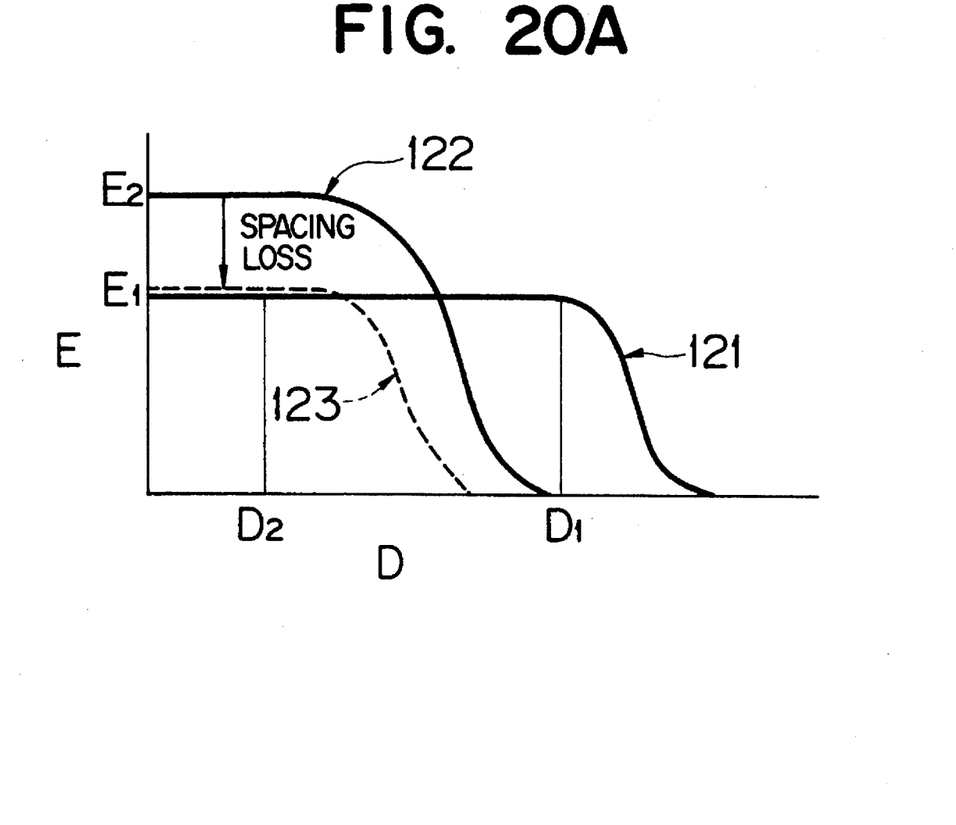
FIG. 20A is a graph showing the relationship between the bit density of a recording medium and a read output.
Figure 20B:
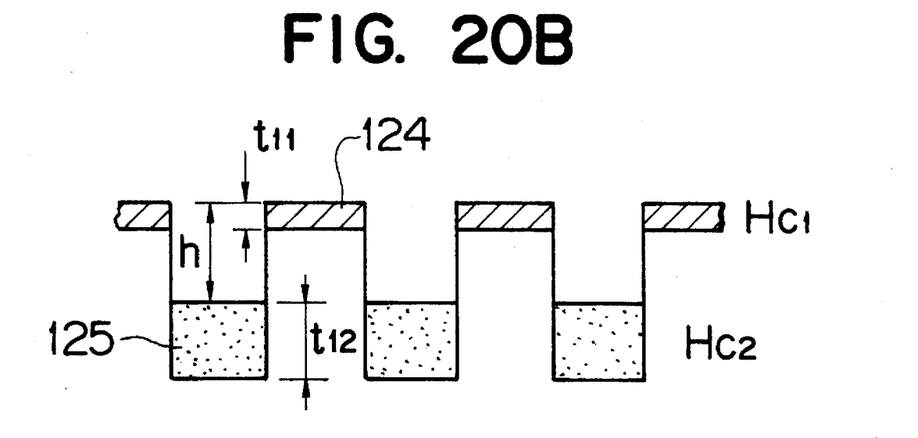
FIG. 20B is a sectional view showing the data track and servo track of the magnetic layer.

FIGS. 20A and 20B are views for explaining a further embodiment of the present invention. In FIG. 20A, the abscissa represents a bit density D and the ordinate represents the output E from the medium. Then E generally exhibits the characteristic shown as curve 121 in FIG. 20A. Now it is assumed that in FIG. 20B, the coercive force Hc1 and film thickness t11 providing curve 121 are selected for the magnetic layer 124 of the data track laminated on the land portion of the medium. In this case, the film having the coercive force Hc2 smaller than that of data track or the film thickness t12 larger than that of the data track is laminated on the groove portion of the medium as the magnetic layer 125 of a servo track (Hc1>Hc2, t11<t12). The magnetic layer 125 has a characteristic shown as curve 122 in FIG. 20A. Since the servo track has a different spacing from the medium than the data track, when considering the spacing loss, the curve 122 lowers as a whole from E2 to E1. If the depth h of the groove portion, i.e. the groove is set so that the output curve 121 of the data track and the output curve of the servo track partially overlap each other, the latter curve is shown as curve 123 in FIG. 20A. Then, if the recording frequency of the data head, and hence the bit density is set for D1, the servo signal recorded on the medium is not influenced by the data signal when the data signal is rewritten. On the other hand, the recording frequency of the servo head, and hence the bit density is set for D2. The servo signal and the data signal are separately extracted by means of the frequency separation technique described above. Additionally, for example, a Co-Ni film with large coercive force having a thickness of about 500 Å is laminated on the land portion as the magnetic layer 124. The depth of the groove is set for about 5000 Å. Further, a Co-Ni film having a thickness of 1000 Å to several 1000 Å is laminated on the groove portion as the magnetic layer 125. The coercive force Hc of the film 125 is relatively low (800 Oe) and the saturated magnetization force Ms is relatively high whereas the coercive force of the film 125 is relatively high (1500 Oe) and the saturated magnetization is thereof, is relatively low.

Figure 21A:
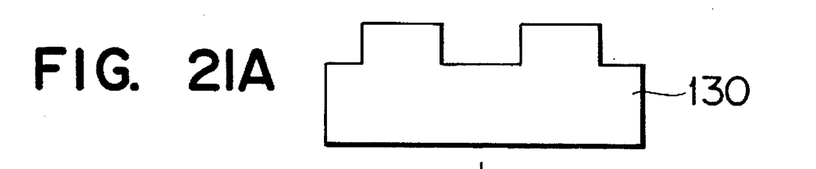
FIGS. 21A to 21F and FIGS. 22A to 22F are sectional views for explaining the fabricating process of a discrete medium according to the present invention.
Figure 21B:
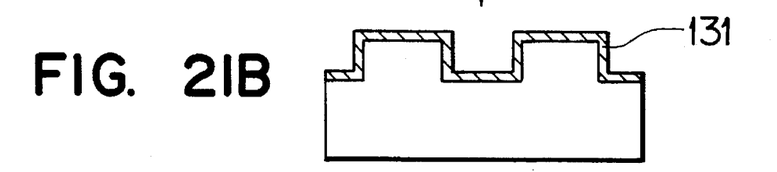
Figure 21C:
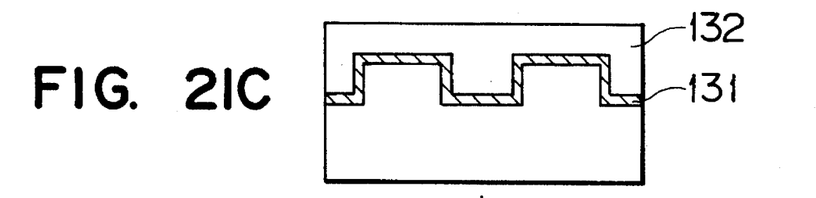
Figure 21D:
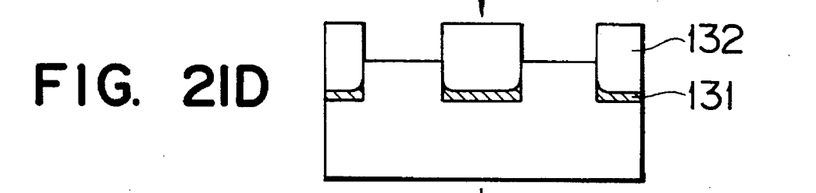
Figure 21E:
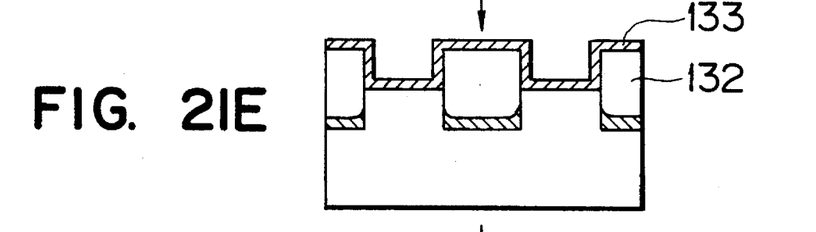
Figure 21F:
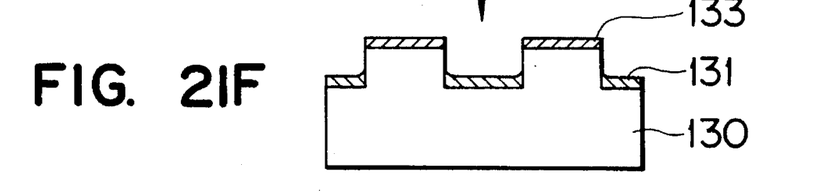

Now referring to FIGS. 21A to 21F and FIGS. 22A to 22F, explanation will be given for the process for fabricating a discrete recording medium used in the present invention. FIGS. 21A to 21F show the process for fabricating a desired medium on the substrate with track grooves previously provided. First, a medium substrate having a predetermined pitch is prepared and a mask having the same pitch is also prepared through a mask process (not shown) (FIG. 21A). A magnetic layer 131 for servo tracks is laminated on the substrate thus prepared by evaporation or sputtering (FIG. 21B). The state thus formed is entirely the same as that shown in FIG. 10. A resist 132 is applied on the magnetic layer 131 through e.g. spin coating (FIG. 21C). The resist 132 is exposed to light and developed using the mask prepared and unnecessary parts of the magnetic layer are removed by etching process (FIG. 21D). A magnetic layer 133 for data tracks is laminated on the surface (FIG. 21E). Finally, the resist 132 is removed (FIG. 21F), thus forming a desired structure of the medium as shown in FIG. 9.

Figure 22A:
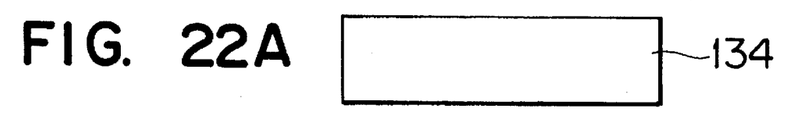
Figure 22B:
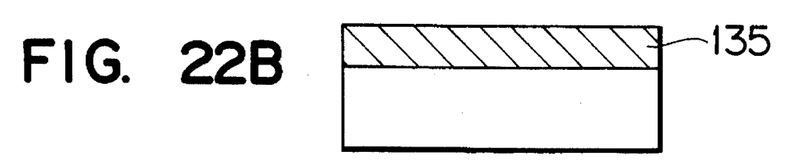
Figure 22C:
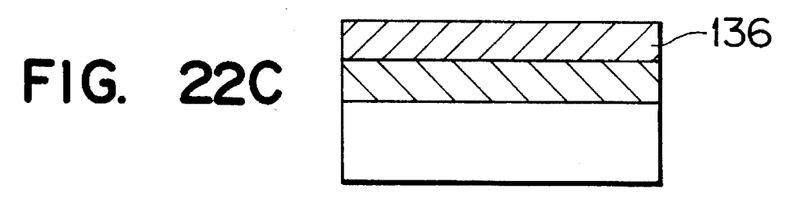
Figure 22D:
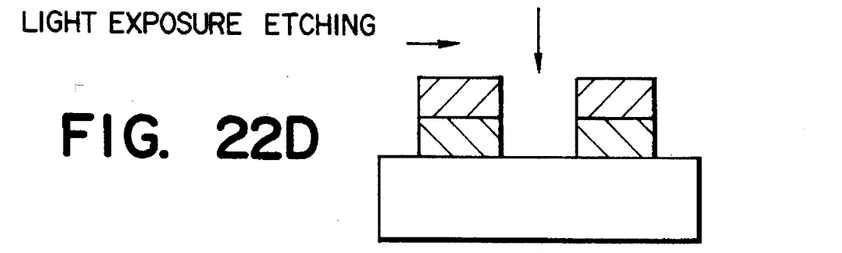
Figure 22E:
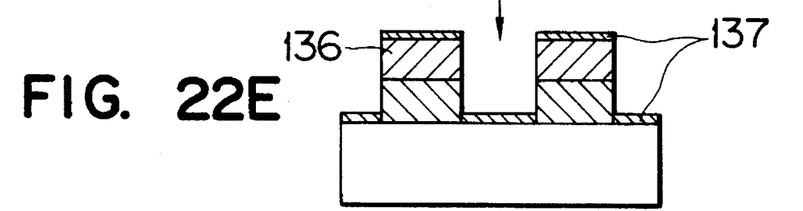
Figure 22F:
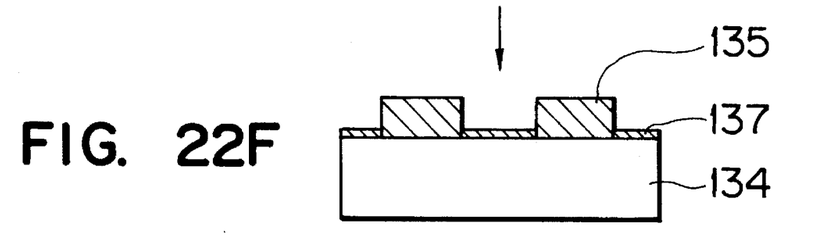

FIGS. 22A to 22F show the process for fabricating the desired medium on a flat substrate. First, the substrate 134 having a flat surface is prepared (FIG. 22A). A magnetic layer 135 for data tracks is laminated by evaporation or sputtering (FIG. 22B). A resist 136 is applied on the magnetic layer 135 by e.g. spin coating (FIG. 22C). The resist 136 is exposed to light and developed using the mask prepared and unnecessary parts of the magnetic layer 135 are removed by etching process (FIG. 22D). A magnetic layer 137 for servo tracks is laminated on the surface (FIG. 22E). Finally, the resist 136 is removed (FIG. 22F), thus forming a desired structure of the medium as shown in FIG. 11.

Additionally, prior to incorporating the discrete medium completed in a disk device, write for servo tracks may be performed as a step in the process of fabricating the disk using the device dedicated to each medium.

Figure 23:
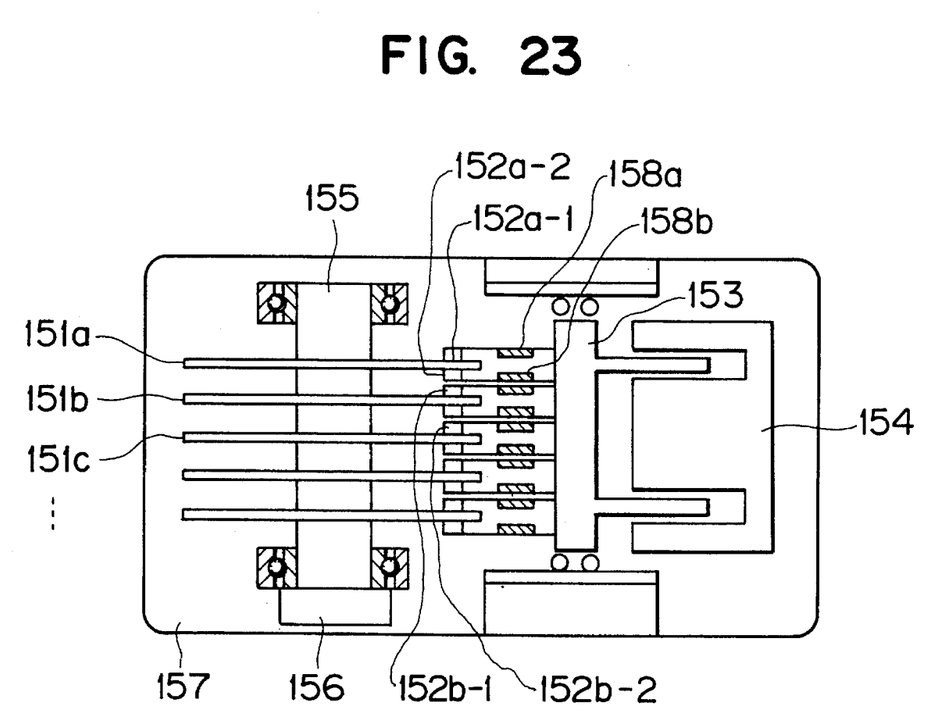
FIG. 23 is a sectional view of an embodiment of the magnetic recording disk drive according to the present invention.

FIG. 23 is a plan view of an embodiment of the disk device according to the present invention. In FIG. 23, 151a, 151b, 151c, . . . denote magnetic disk medium, respectively, as shown in FIG. 9, which are assembled in a stacked structure. They are attached to a spindle 155, and rotated at a predetermined speed by a spindle motor 156. 152a-1, 152a-2, 152b-1, 152b-2, . . . denote a magnetic head, respectively for accessing the corresponding medium, which are connected with a carriage 153. These magnetic heads are magnetic heads used for both servo and data, individually used for servo and data, or individually used for read and write, which are mounted on an air-floating slider. The carriage 154 connected with a VCM (voice coil motor) serves to drive the heads in the radial direction of the disks. The structure including attendant circuits is sealed within a box 157 to prevent dust from intruding into the box.

When the recording media are built in a disk drive, the center of the track circles on the recording media do not necessarily coincide with the rotating center of a spindle attached to the media. On the other hand, all the magnetic heads are in a predetermined position relationship so that it is impossible to always locate the respective heads on the tracks of all the recording media. This is an important idea for the concept of a cylinder in order to enhance the throughput of the drive. To this end, discrete actuators 158a, 158b, . . . are added to the corresponding attaching arms to individually drive the magnetic heads.

In accordance with the present invention, the servo bandwidth can be sufficiently widened, and a positioning system with the servo signal with high quality can be provided because of a serial servo system. This greatly contributes to realize the positioning servo system with high performance in a magnetic recording disk drive.

We claim:

1. A method of head positioning and recording and reproducing information in a device in which a magnetic recording medium with data tracks for recording information therein is provided and a magnetic head is positioned on one of the data tracks to record and read out the information, the data tracks being separated by a groove located therebetween, the method comprising the steps of:

recording a data signal on one of the data tracks of said recording medium;

recording a servo signal on the grooves between adjacent ones of said data tracks, a depth of each of the grooves being less than a thickness of a magnetic layer for the respective data tracks and a coercive force of a magnetic layer for the grooves being smaller than that of the magnetic layer for the data tracks; and positioning said magnetic head on the data tracks on the basis of said servo signal.

2. A method according to claim 1, wherein said data signal and said servo signal are simultaneously read out by a magnetic head having a gap length extending over at least one data track and at least two servo tracks.

3. A method according to claim 2, wherein said servo signal is recorded as a one-phase dibit signal.

4. A method according to claim 3, wherein said servo signal is subjected to a servo mechanism to provide a signal having the same amplitude as the data signal.

5. A method according to claim 1, wherein said data signal and said servo signal are recorded and read out by different magnetic heads.

6. A method according to claim 5, wherein the data head for reading out the data signal has a shorter gap length than that of the servo head for reading out the servo signal.

7. A method according to claim 5, wherein the data head for reading out the data signal has a lower saturation magnetic flux density than that of the servo head for reading out the servo signal.

8. A method according to claim 5, wherein the current I1 used for recording the data signal by the data head is smaller than the current I2 used for recording the servo signal by the servo head.

9. A method according to claim 1, wherein the magnetic layer of said servo tracks has a smaller coercive force than that of said data tracks.

10. A method of head positioning and recording and reproducing information in a device in which a magnetic recording medium with data tracks for recording information thereon is provided and a magnetic head is positioned on the data tracks to record and read out the information, the data tracks being separated by grooves located therebetween, the method comprising the steps of:

recording a data signal on the data tracks of said recording medium with a magnetic head at a predetermined recording current of I1;

recording a servo signal on the grooves between adjacent ones of the data tracks;

assuming that a depth h of each of the grooves is less than a thickness of a magnetic layer for the data tracks, P is an overwrite amount permitting recorded data to be rewritten, DD is the distance between the head and a surface of the groove, Ix1 and Ix2 are the recording currents at the magnetic layer for the data tracks and at the magnetic layer for the servo tracks respectively when the overwrite amount is P, setting I1 to satisfy the following relationship, $$Ix1 < I1 < Ix2;$$

and positioning said magnetic head on the data track on the basis of said servo signal.

11. A method according to claim 10, wherein in said recording step, said servo signal is recorded with a servo head at a current I2, and I1 and I2 are set with respect to predetermined values of DD and h so that reproduction outputs of said servo signal and said data signal are substantially equal.

12. A method according to claim 10, wherein assuming that

D1 is the bit density of the data signal, D2 is the bit density of the servo signal, and Dx is the bit density which gives the same output level of the signal from the data track surface and from the servo track surface, D1, D2, and Dx are set to satisfy the following relationship:

$$D2 < Dx \text{ and } D1 > Dx.$$

13. A method according to claim 10, wherein said data signal has a frequency of 1 MHz or more, and the servo signal has a frequency of 0.4 MHz or less.

14. A method of head positioning in an information recording and reproducing device in which a magnetic recording medium with data tracks for recording information thereon is provided and a magnetic head is positioned on the data track to record and read out the information, the data tracks are discrete tracks in which adjacent data tracks are separated by a servo track located between magnetic layers forming said data tracks and said servo tracks are different in their thickness and composition, the method comprises steps of:

recording a data signal on the data tracks of said recording medium;

recording a servo signal on the grooves between adjacent ones of the data tracks;

assuming that a depth of each of the grooves is smaller than a thickness of the magnetic layer for the data tracks and that D1 is the bit density of the data signal, D2 is the bit density of the servo signal, and Dx is the bit density which gives the same output level of the signal from the data track surface and from the servo track surface, D1, D2, and Dx are set to satisfy the following relationship:

$$D2 < Dx \text{ and } D1 > Dx;$$

and positioning said magnetic head on the data track on the basis of said servo signal.

15. A magnetic recording disk drive and a magnetic disk having data tracks on which data are recorded comprising:

a spindle for rotating the magnetic disk;

a magnetic head for recording and reading out a data signal on and from the data tracks;

the magnetic head for reading out the servo signal;

servo tracks separately arranged between the data tracks in a direction transverse to a track width of the magnetic disk, for recording a servo signal on a portion of a magnetic layer lower than that of the magnetic layer for recording the data signal on the data tracks, a depth of the grooves being less than a thickness of a magnetic layer for the data tracks and a coercive force of the lower magnetic layer portion for the servo track being less than that of the magnetic layer portion for the data tracks; and a servo circuit and an actuator for positioning the data magnetic head on the data tracks on the basis of the servo signal, wherein the spacing between the magnetic head and a magnetic layer surface of the data tracks is different from that between the magnetic head and a magnetic layer surface of the servo tracks, and wherein there is no other magnetic layer formed between said magnetic head and said surface of the data tracks and between said magnetic head and said surface of the servo tracks, respectively.

16. A magnetic recording disk drive and disk according to claim 15, wherein said magnetic layers forming said data tracks and said servo tracks are different in their thickness and composition.

17. A magnetic recording disk drive and disk according to claim 16, wherein assuming that D1 is the bit density of the data signal, D2 is the bit density of the servo signal, and Dx is the bit density which gives the same output level of the signal from the data track surface and from the servo track surface, D1, D2 and Dx are set to satisfy the following relationship:

$$D2 < Dx \text{ and } D1 > Dx.$$

18. A magnetic recording disk drive and disk according to claim 16, wherein said data magnetic head records said data signal at a frequency of 1 MHz or more whereas said servo magnetic head records said servo signal at a frequency of 0.4 MHz.

19. A magnetic recording disk drive and disk according to claim 16, wherein said magnetic disk has said magnetic layers formed on land portions and groove portions formed on the medium, and there is no other magnetic layer over said land portions and said groove portions, respectively.

20. A magnetic recording disk drive according to claim 19, wherein said magnetic recording medium has the magnetic layers formed on an upper surface of the medium and on a side surface of the land portions and groove portions.

21. A magnetic recording disk drive according to claim 15, wherein said magnetic recording medium has magnetic layers serving as data tracks and other magnetic layers serving as servo tracks formed on the flat surface of a substrate, and said data tracks and said servo tracks having different heights.

22. A magnetic recording disk drive according to claim 15, wherein said data magnetic head and said servo magnetic head are constituted with one magnetic head.

* * * * *